United States Patent Office 3,468,944
Patented Sept. 23, 1969

3,468,944
METHOD OF PREPARING KETOACIDS
Harry Chafetz, Poughkeepsie, and Theodore C. Mead, Glenham, N.Y., assignors to Texaco Inc., New York, N.Y., a corporation of Delaware
No Drawing. Filed May 31, 1966, Ser. No. 553,695
Int. Cl. C07c *51/09, 51/00*
U.S. Cl. 260—526
6 Claims

ABSTRACT OF THE DISCLOSURE

A method of preparing keto-monocarboxylic acids from 2-hydrocarbylperoxycycloalkanone directly or from 2-hydrocarbylperoxycycloalkanone derived from the reaction of 2-hydrocarbylcycloalkanone and hydrocarbyl hydroperoxide, comprising contacting the formed or preformed cycloperoxyalkanone with a strong base and acidifying the resultant reaction mixture.

---

This invention relates to a method of preparing ketoacids. More particularly, it pertains to a method of preparing keto-monocarboxylic acids from 2-hydrocarbylperoxycycloalkanone directly or from 2-hydrocarbylperoxycycloalkanone derived from the reaction of 2-hydrocarbylcycloalkanone and hydrocarbyl hydroperoxide.

Hereinafter and hereinbefore the term "cycloalkanone" is intended to denote cyclopentanone and cyclohexanone.

The keto-carboxylic acids prepared by the method of the invention are useful as starting reactants in the preparation of ketoacid esters of alkanol, and amides and N-substituted amides of the ketoacids. These ketoacid esters, amides and substituted amide derivatives are useful as detergent-dispersant additives for lubricating oils, particularly when in combination with aromatic sulfonates.

In the past, one of the methods employed to manufacture the ketoacids comprised directly oxidizing a 2-hydrocarbylcycloalkanone by contacting said cycloalkanone with oxygen or an oxygen containing gas in the presence of a catalyst such as an alkali metal fluoride, alkali metal hydroxide or by contacting the alpha-cycloalkanone with a severe oxidizing agent combination such as a mixture of chromic oxide and sulfuric acid. Although these previous methods rendered up to satisfactory results, further improvement of yields of ketoacid products was still to be desired.

METHOD

We have discovered, and this constitutes our invention, a method of preparing in improved yields a ketoacid of the general formula:

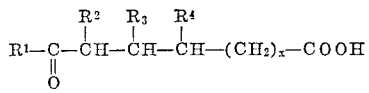

where $R^1$ is a hydrocarbon radical (hydrocarbyl) selected from the group consisting of alkyl, cycloalkyl, aryl, alkaryl and aralkyl of from 1 to 20 carbons, $R^2$, $R^3$ and $R^4$ are members selected from the group consisting of hydrogen, alkyl, cycloalkyl, aryl, alkaryl and aralkyl of less than 21 carbons and at least two of said $R^2$, $R^3$ and $R^4$ members being hydrogen, and $x$ is zero or 1. In addition, the method of our invention produces as a by-product desirable alcohols.

Sub-combination method

More particularly, our method comprises reacting a 2-hydrocarbylperoxycycloalkanone of the general formula:

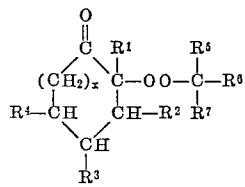

where $R^1$, $R^2$, $R^3$, $R^4$ and $x$ are as heretofore defined and $R^5$, $R^6$ and $R^7$ are hydrogen or hydrocarbyl of from 1 to 20 carbons selected from the group consisting of alkyl, cycloalkyl, aryl, alkaryl and aralkyl, with a strong base to form an intermediate salt of the ketoacid final product. The reaction of the peroxycycloalkanone with base is then followed by acidification of the reaction mixture to release the ketoacid from its intermediate salt form.

In the strong base reaction step the temperature is desirably maintained at between about −10 and 80° C. The acidification step is normally conducted at between about −10 and 50° C. Advantageously, the mole ratio of peroxycycloalkanone reactant to base is between about 1:1 and 1:4 and the amount of the acidifying acid employed is essentially a stoichiometric amount required to release the ketoacid from its salt. Normally, acidifying the reaction mixture to a pH of less than about 3 will accomplish the total conversion of the ketoacid salt into the desired acid form. Under preferred conditions, an inert solvent is employed with the base and cycloalkanone reactant, said solvent normally comprising between about 10 and 80 wt. percent of the reaction mixture.

The ketoacid is recovered from the final reaction mixture by standard means such as evaporating the inert reaction solvent leaving solid residue, selectively extracting the ketoacid and alcohol by-products from said residue, filtering out the undissolved salts, and fractionally distilling the extract solution to recover the desired ketoacid.

Examples of the 2-hydrocarbyl-2-peroxycycloalkanone reactants contemplated herein are 2-methyl-2-t-butylperoxycyclohexanone, 2-isopropyl-2-cumylperoxycyclohexanone, 4-(p-tolyl)-2-hexyl-2-benzylperoxycyclohexanone, 5-benzyl-2-phenyl-2-pentylperoxycyclohexanone, 3-isooctyl-2-butyl-2-propylperoxycyclohexanone, 2-cyclohexyl-2-t-butylperoxycyclohexanone, 2-methyl-2-t-butylperoxycyclopentanone, 2-isopropyl-2-cumylperoxycyclopentanone, 4-(p-tolyl)-2-hexyl-2-benzylperoxypentanone, 3-isooctyl-2-butyl-2-propylperoxycyclopentanone and 2-cyclohexyl-2-t-butylperoxycyclopentanone.

Examples of the strong base reactants contemplated herein are those selected from the group consisting of alkaline earth and alkali metal hydroxides, alkaline earth and alkali metal alkanoates of from 1 to 10 carbons, hydrocarbyl primary amines of from 1 to 10 carbons, alkali metal and alkaline earth amides and ammonia. Specific base compounds contemplated are sodium hydroxide, potassium hydroxide, lithium hydroxide, barium hydroxide, calcium hydroxide, methylamine, ethylamine, sodium methylate, potassium methylate, sodium amide and barium amide.

The criteria for the inert reaction solvent is that it be inert and desirably solubilize both the base and peroxy cycloalkanone reactant to form a homogeneous reaction solution. Specific examples of the inert reaction solvents contemplated herein are aqueous and non-aqueous liquid alkanols such as methanol, aqueous ethanol, ethanol, n-propanol and isopropanol. Other suitable solvents are liquid alkyl ethers, liquid alkyl substituted amides and liquid alkyl sulfoxides such as ethyl ether, dioxane, ethyl n-butyl ether, tetrahydrofuran, dimethylformamide, diethylformamide, dimethylsulfoxide and diethylsulfoxide.

Particular examples of extraction solvents that may be employed for removal of the non-salt organic compounds and ketoacid products from the acidified reaction mixture are any of the inert liquid hydrocarbons such as xylene, benzene, toluene and isooctane.

Examples of suitable acidifying acids are strong acids such as the mineral acids, e.g., hydrochloric acid and sulfuric acid. Other suitable strong acids are cation exchange resins, e.g., the phenolic methylene sulfonic type such as Amberlite IR–105 and nuclear sulfonic type such as Amberlite IR–120. Still other suitable acids are halogenated acetic acids, e.g., chloroacetic acid and trichloroacetic acid.

Examples of the ketoacid products contemplated herein are 6-oxoheptanoic acid, 4-(p-tolyl)-6-oxododecanoic acid; 7 - methyl-6-oxooctanoic acid; 3-benzyl-6-phenyl-6-oxohexanoic acid; 5-isooctyl-6-oxodecanoic acid; 5-oxohexanoic acid; and 2-methyl-5-oxononanoic acid.

The method of the invention is further described by the following equations utilizing sodium hydroxide as the base and hydrochloric acid as the acidifying acid:

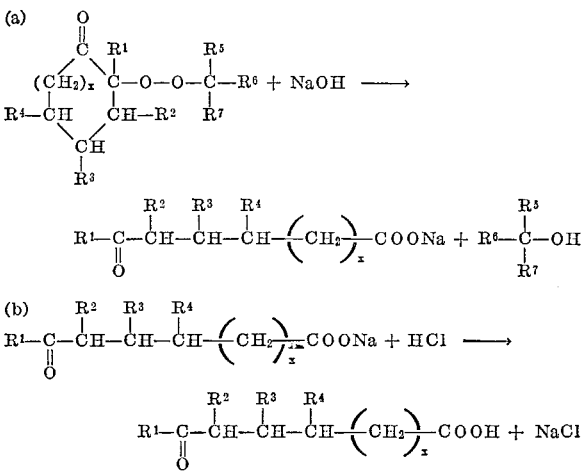

where $R^1$, $R^2$, $R^3$, $R^4$, $R^5$, $R^6$, $R^7$ and $x$ are as heretofore defined.

Combination method

Another embodiment of the method of the invention comprises a combination process whereby the 2-hydrocarbyl-2-peroxycycloalkanone is first formed by reacting 2-hydrocarbylcycloalkanone of the formula:

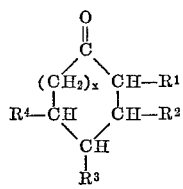

where $R^1$, $R^2$, $R^3$, $R^4$ and $x$ are as heretofore described with a hydrocarbyl hydroperoxide of the formula:

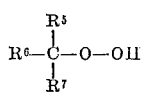

where $R^5$, $R^6$ and $R^7$ are as heretofore defined, in the presence of a salt catalyst at a temperature between about 10 and 100° C. for a period of between about 1 and 15 hours. The following equations further illustrate the reaction:

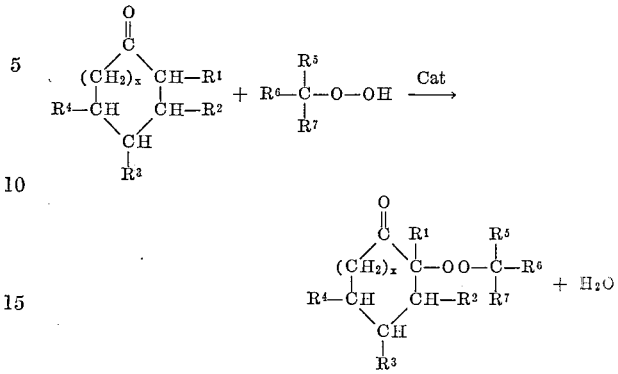

Then as a second step in this combination process the resultant hydrocarbylperoxycycloalkanone is converted into the ketoacid by successive treatments with base and acid in the manner heretofore described in respect to the sub-combination method.

In the first step of the combination process the mole ratio of hydrocarbylcycloalkanone to hydroperoxide is advantageously between about 1:2 and 6:1 with the salt catalyst constituting between about 0.001 and 1 wt. percent of the reaction mixture. In order to facilitate contact of reactants, inert liquid reaction media may be employed such as t-butyl alcohol benzene, cyclohexane and liquid primary and secondary saturated aliphatic hydrocarbons, e.g., pentane and isooctane.

In said first step the 2-hydrocarbyl-2-peroxycycloalkanone product may be recovered by standard means such as filtration to separate it from catalyst followed by distillation to remove low boilers leaving said 2-hydrocarbylperoxycycloalkanone as residue.

Examples of the 2-hydrocarbylcycloalkanone precursor reactants are 2,3-dimethylcyclohexanone, 2-isopropylcyclohexanone, 2-hexylcyclohexanone, 2-phenylcyclohexanone, 2-benzylcyclohexanone, 2-(p-tolyl)cyclohexanone, 2-cyclohexylcyclohexanone, 2,5-dimethylcyclopentanone, 2-methyl-5-phenylcyclopentanone and 2-cyclohexyl-4-benzylcyclopentanone.

Specific examples of the hydroperoxide reactant in the first step reaction are t-butyl hydroperoxide, cumylhydroperoxide, benzyl hydroperoxide, t-pentyl hydroperoxide, isopropyl hydroperoxide and cyclohexyl hydroperoxide.

Examples of the salt catalyst contemplated in the first reaction step are the transition metal salts of strong acids such as hydrohalide acid (e.g., hydrochloric, hydrobromic acid), sulfuric acid, nitric acid and acetic acid. Suitable specific catalyst salts are cuprous chloride, cobaltous chloride, manganous chloride, nickel sulfate, ferrous nitrate, ferrous sulfate and cobaltous acetate.

The following examples further illustrate the method of the invention but are not to be construed as limitations thereof:

EXAMPLE I

This example illustrates the preparation of the 2-hydrocarbyl-2-peroxycycloalkanone reactant and the first stage of the combination method.

To a 200 mls. flask fitted with a thermometer and reflux condenser fitted with a drying tube, there was charged 58 grams (0.52 mole) of 2-methylcyclohexanone, 25 grams (0.11 mole) of 40 wt. percent t-butyl hydroperoxide in t-butyl alcohol and 0.1 gram of cuprous chloride. The resultant mixture was heated at 60° C. for 7 hours with magnetic stirring. The final solution was cooled, filtered from the copper salt and the low boilers were removed by distillation under 2 mm. Hg pressure at a maximum temperature of 68° C. A green mobile distillation residue (7 grams, 32 wt. percent yield based on charged hydroperoxy) remained having a refractive index of $n_D^{21}$ of 1.4526, an infrared carbonyl absorption at $5.77\mu$ as compared to $5.82\mu$ for 2-methylcyclohexanone. The green residue oxidized ethanolic iodide ion and was identified as 2-methyl-2-t-butylperoxycyclohexanone of the formula:

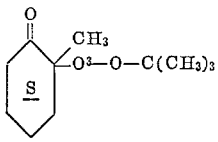

EXAMPLE II

This example illustrates the basic method of the invention and the second step of the combination method of the invention.

To a 50 mls. glass flask fitted with a magnetic stirrer, thermometer and reflux condenser, there was charged 1 gram of 2-methyl-2-t-butylperoxycyclohexanone as prepared in Example I, 15 mls. of 0.5 N-sodium hydroxide and 15 mls. of ethanol. The resultant mixture was heated at 50° C. for 2 hours, cooled and acidified with 1 ml. of conc. hydrochloric acid. The ethanol solvent was then removed from the reaction mixture on a rotary evaporator under vacuum (90° F., 15 mm. Hg) and the residue was mixed with 15 mls. of benzene. The resultant mixture was filtered and the precipitate was washed twice with 5 mls. portions of benzene and the washings were added to the filtrate. The benzene was removed from the filtrate on a rotary evaporator under reduced pressure (90° F., 15 mm. Hg). The residue (10.7 grams) was identified by chromatographic analysis as 6-oxoheptanoic acid in a yield of 86 wt. percent.

We claim:
1. A method of preparing a ketoacid of the formula:

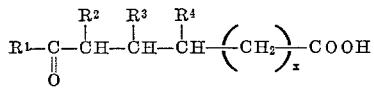

where $x$ is an integer of 0 or 1, $R^1$ is a hydrocarbyl radical selected from the group consisting of alkyl, cycloalkyl, aryl, alkaryl and aralkyl of from 1 to 20 carbons and $R^2$, $R^3$ and $R^4$ are members selected from the group consisting of hydrogen and alkyl, cycloalkyl, aryl, alkaryl and aralkyl of less than 21 carbons, where at least two of said members are hydrogen comprising:

(a) first contacting at a temperature between about 10 and 100° C. a cycloalkanone of the formula:

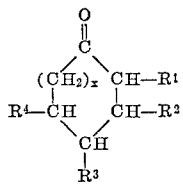

where $R^1$, $R^2$, $R^3$, $R^4$ and $x$ are as heretofore defined with a hydrocarbyl peroxide of the formula:

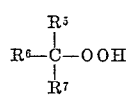

where $R^5$, $R^6$ and $R^7$ are selected from the group consisting of hydrogen, alkyl, cycloalkyl, aryl, alkaryl, and aralkyl of less than 21 carbons in the presence of between about 0.001 and 1 wt. percent based on the reaction mixture of a transition metal salt catalyst of a strong acid selected from the group consisting of hydrohalide acid, sulfuric acid, nitric acid and acetic acid to form a 2-hydrocarbyl-2-peroxycycloalkanone of the formula:

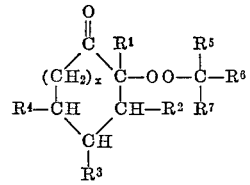

where $R^1$, $R^2$, $R^3$, $R^4$, $R^5$, $R^6$ and $R^7$ and $x$ are as heretofore defined, (b) contacting at a temperature between about −10 80° C. said 2 - hydrocarbyl - 2 - peroxycycloalkanone with a strong base selected from the group consisting of alkali metal hydroxide, alkaline earth metal hydroxide, alkali metal alkanoate and alkaline earth metal alkanoate of from 1 to 10 carbons, alkali metal amide, alkaline earth metal amide, ammonia and hydrocarbyl primary amine of from 1 to 10 carbons to form a resultant reaction mixture containing a ketoacid salt intermediate and then acidifying at a temperature between about −10 and 50° C. said resultant reaction mixture with an acid to form said ketoacid.

2. A method of preparing a ketoacid of the formula:

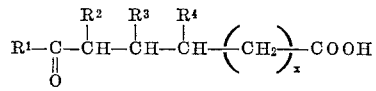

where $x$ is zero or 1, $R^1$ is hydrocarbyl selected from the group consisting of alkyl, cycloalkyl, aryl, alkaryl and aralkyl of from 1 to 20 carbons and $R^2$, $R^3$ and $R^4$ are members selected from the group selected from the group consisting of hydrogen and alkyl, cycloalkyl, aryl, alkaryl and aralkyl of from 1 to 20 carbons and where at least two of said members are hydrogen comprising contacting at a temperature between about −10 and 80° C. a 2-hydrocarbyl-2-peroxycycloalkanone of the formula:

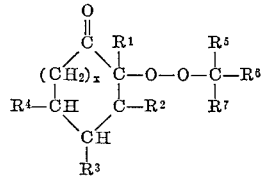

with a strong base selected from the group consisting of alkali metal hydroxide, alkaline earth metal hydroxide, alkali metal alkanoate and alkaline earth metal alkanoate of from 1 to 10 carbons, alkali metal amide, alkaline earth metal amide, ammonia, and hydrocarbyl primary amine of from 1 to 10 carbons, to form a resultant reaction mixture containing a ketoacid salt intermediate and then acidifying at a temperature between about −10 and 50° C., the resultant reaction mixture with an acid to form said ketoacid, said $R^5$, $R^6$ and $R^7$ selected from the group consisting of hydrogen, alkyl, cycloalkyl, aryl, alkaryl and aralkyl of less than 21 carbons.

3. A method in accordance with claim 2 wherein said contacting is conducted in the presence of an inert liquid reaction medium and in a mole ratio of said peroxycycloalkanone to said base of between about 1:1 and 1:4, said acidifying comprising contacting said intermediate with about a stoichiometric amount of said acid in respect to said intermediate and wherein said acid is a member selected from the group consisting of mineral acid, cation exchange resin and halogenated acetic acid.

4. A method in accordance with claim 3 wherein said ketoacid is 6-oxohexanoic acid, said 2-hydrocarbyl-2-peroxycyclohexanone is 2-methyl-2-t-butylperoxycyclohexanone, said base is sodium hydroxide, said mineral acid is hydrochloric acid and said inert reaction medium is aqueous ethanol.

5. A method in accordance with claim 1 wherein said second contacting step is conducted in the presence of an inert liquid solvent, the mole ratio of said 2-hydrocarbylcycloalkanone to said hydroperoxide being between about 10:1 and 1:4, said catalyst being present in an amount of between about 0.001 and 1 wt. percent based on the first contacting reaction mixture, said 2-hydrocarbyl-2-peroxycycloalkanone and said base being present in a mole ratio of between about 1:1 and 1:4, said acidifying comprising contacting said intermediate with about a stoichiometric amount of said acid in respect to said intermediate, and said acid is a member selected from the group consisting of mineral acid, cation exchange resin and halogenated acetic acid.

6. A method in accordance with claim 5 wherein said 2 - hydrocarbylcycloalkanone is 2 - methylcycloalkanone, said hydrocarbyl hydroperoxide is t-butyl hydroperoxide, said catalyst is cuprous chloride, said 2-hydrocarbyl-2-peroxycycloalkanone is 2-methyl-2-butylperoxycyclohexanone, said base is sodium hydroxide, said acid is hydrochloric acid, said solvent is t-butyl alcohol, said inert liquid medium is aqueous ethanol and said extraction solvent is benzene.

References Cited

Hauser et al.: Journal of American Chemical Society, vol. 70, p. 4023 (1948).

LORRAINE A. WEINBERGER, Primary Examiner

M. G. BERGER, Assistant Examiner

U.S. Cl. X.R.

260—515, 514, 586, 590, 617, 618, 638